March 31, 1964 H. W. WARDLEIGH 3,127,182
THERMALLY ACTUATED SEALING MEANS
Filed Oct. 3, 1960

INVENTOR.
HENRY W. WARDLEIGH
BY
Francis H. Bebee
ATTORNEY

United States Patent Office 3,127,182
Patented Mar. 31, 1964

3,127,182
THERMALLY ACTUATED SEALING MEANS
Henry W. Wardleigh, Phoenix, Ariz., assignor to The Garrett Corporation, Los Angeles, Calif., a corporation of California
Filed Oct. 3, 1960, Ser. No. 60,064
8 Claims. (Cl. 277—26)

This invention relates to thermally actuated seals and aims to provide an improved dynamic sealing device for use at the reduced temperatures encountered in the handling of cryogenic materials, such as liquid oxygen, nitrogen, hydrogen, helium, and the like.

When valves or couplings are provided in fluid lines for the handling of cryogenic materials, difficulties are often encountered because of the differential contraction of parts of the valves or couplings due to the wide temperature ranges and extremely low temperatures involved. Where seals are provided which will be effective at normal ambient temperatures, the contraction and changes in shape of the seals at extremely low temperatures often render them ineffective.

Accordingly, it is an object of this invention to provide an improved thermally responsive sealing device for effectively sealing a fluid conduit over the wide range of temperatures encountered with cryogenic materials.

Another object of this invention is to provide a flexible sealing device for use with valves or couplings, the sealing device including a temperature responsive backup ring or fulcrum to hold it in proper sealing position when there is a predetermined reduction in temperature.

Another object of the invention is to provide a flexible sealing device having a backup ring or fulcrum constructed of a material whose coefficient of expansion is such that the fulcrum will contract to a lesser extent than the complemental parts when there is a reduction in temperature.

A further object of this invention is to provide a flexible seal having a fulcrum in operative contact therewith and a temperature responsive compensating member adjacent to said fulcrum for moving said fulcrum in a seal activating direction when there is a predetermined reduction in temperature.

Other objects and advantages will be apparent from the following description of two forms of the invention shown in detail in the accompanying drawing, in which.

Figure 1:
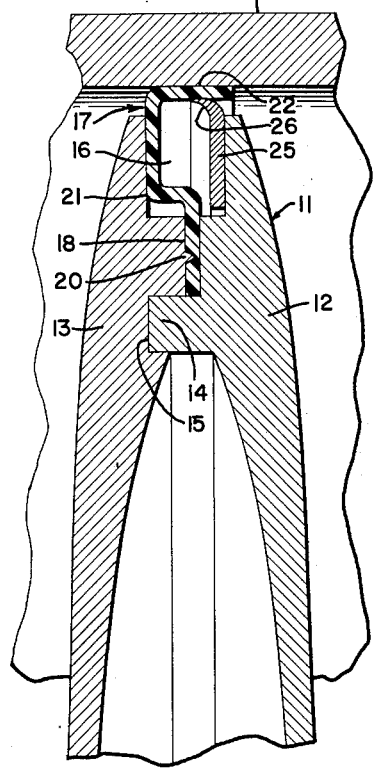
FIG. 1 is a fragmentary cross-sectional view of a butterfly valve having a sealing device constructed in accordance with the present invention.

Referring now to the drawing, and particularly FIG. 1, there is shown a portion of a pipe or fluid conduit 10, which may be a large, rapid transfer pipe for delivering cryogenic materials, such as liquid oxygen, from one location or source to a suitable receiver, such as a storage tank. Such transfer pipes are usually from 6 to 10 inches in diameter and may be provided with a butterfly valve 11 for controlling the flow of fluid therethrough. Butterfly valve 11 comprises inner and outer plates 12 and 13, respectively, held together with bolts or other mechanical means (not shown) and indexed by an annular ring 14 formed on the inner plate 12 and disposed in a corresponding groove 15 in the outer plate 13. The plates of the valve member are shaped to provide an annular groove 16 between the peripheral edges thereof to hold a flexible sealing member 17. As shown, the flexible sealing member 17 has its inner annular edge portion 18 held between the plates 12 and 13, and sealed by an endless V-shaped rib 20 pressed thereinto so as to prevent leakage between said plates. The member 17 is bent at 21 into contact with one wall of the groove 16, and beyond the periphery of the butterfly valve is provided with an angular sealing flap or flange portion 22 so that it will suitably engage the inner wall of conduit 10. For the purposes of this invention, the sealing member may be made of any flexible material which will not embrittle or contract to too great an extent at very low temperatures (−400° F.). While some metals might be satisfactory, certain plastics or elastomeric polymers, such as those known as Kel-F, Teflon, silicone rubber, and the like, are most suitable, since they have been found to maintain their properties over a wide range of temperatures. In addition to the temperature ranges encountered, the type of fluid to be used in conduit 10 will have a bearing on the particular material selected for the sealing member 17.

Figure 2:
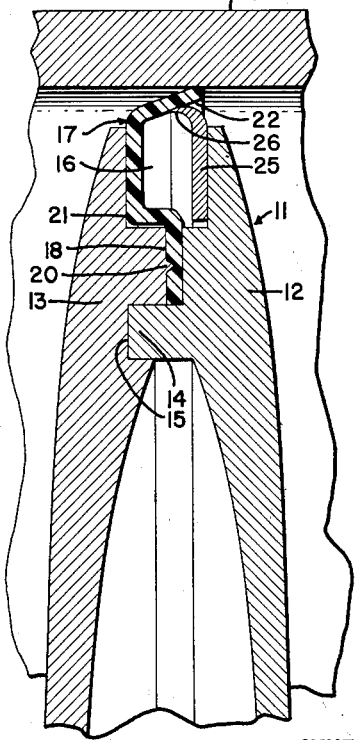
FIG. 2 is a fragmentary cross-sectional view, similar to FIG. 1, showing the parts in exaggerated contracted positions caused by a reduction in temperature.

In order to provide tight sealing engagement of the angular portion 22 of sealing member 17 in contact with the inner wall of conduit 10, a backup ring or fulcrum member 25 is mounted in the annular groove 16 against the inner wall thereof. This backup ring has a curved outer portion 26 which provides a fulcrum for the sealing member 17. The ring is constructed of a material which has a low coefficient of expansion, preferably lower than that of the conduit 10 and the valve 11. Thus, when the parts are subjected to a low temperature, as when liquid oxygen is passed through the conduit 10 upon opening the butterfly valve 11, there will be a contraction of the parts so that they will assume some such relative positions as shown in FIG. 2. Because of the fact that the fulcrum member 25 is constructed of a material having a coefficient of expansion lower than the coefficients of the adjacent parts, the portion 26 will contract a lesser extent than the complemental parts, with the result that the angular sealing flap 22 will be pulled away from the conduit wall 10 at one side of the portion 26 and swung toward the wall at the other side, this movement pressing it into sealing contact with the inner surface of conduit 10. Therefore, the fulcrum member 26 and associate parts constitute a temperature responsive device to hold the sealing member in proper sealing position when there is a reduction in temperature. Due to the fact that the fulcrum member has a lower coefficient of expansion than the coefficients of the complemental parts, there is a differential contraction of the parts which offsets any excessive shrinkage of the sealing member 17 so as to maintain a constant sealing condition between said member and the conduit wall or housing during all changes in temperature.

Figure 3:
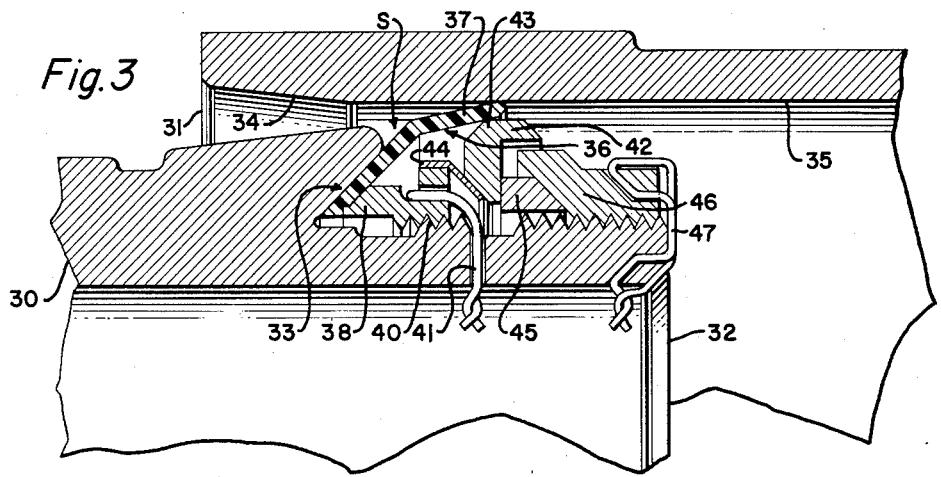
FIG. 3 is a fragmentary cross-sectional view of a slidably separable pipe coupling having a modified form of sealing device constructed in accordance with the present invention.

In FIG. 3, the features of the invention have been shown embodied in a seal S for a slidably separable coupling between a conduit 30, which may lead from a suitable carrier of liquid oxygen, for example, and a conduit 31, which may be connected to a tank in which the liquid oxygen or other cryogenic material is to be stored. Inner end 32 of conduit 30 has a reduced annular portion 33, which forms a space or housing for the seal S, and conduit 31 is tapered at 34 at the outer end of its inner wall 35 so that the conduits 30 and 31 may be easily and slidably fitted together in coupling relationship. A flexible sealing member 36, having an outwardly bent sealing flap or flange portion 37, is mounted on the annular portion 33 and held in proper position by a bevelled sealer retainer ring 38. The retainer ring may be threaded at 40 to the conduit 30 and locked in operative position by suitable wires 41.

To hold the sealing flap 37 in operative contact with the inner wall 35 of conduit 31, a temperature responsive fulcrum member or ring 42, having an angular fulcrum 43, is arranged in the reduced portion 33 immediately adjacent to and forward of the flexible seal 36. The fulcrum ring 42 is in turn held in proper position by an annular alignment spring 44 on one side thereof and a compensating member 45 on the other side. Finally, all of the parts are maintained in adjustable operative relationship by an adjusting nut 46 which is threaded to the conduit 30 and may be held in any adjusted position by locking wires 47.

As in the construction shown in FIGS. 1 and 2, the fulcrum ring 42 is constructed of a metal or other suitable material having a predetermined coefficient of expansion which is low and particularly less than that of the associate conduits 30 and 31. In addition, it is positioned and arranged so that the fulcrum 43 will press the flap or angular portion 37 of flexible seal 36 in sealing engagement with the inner wall 35 of conduit 31 and maintain it in such position over the wide ranges of temperature encountered in the handling of cryogenic materials. To assure proper sealing contact, especially at reduced temperatures, the compensating member 45 is made of a material having a coefficient of expansion even lower than that of the fulcrum ring 42. Hence, such compensating member 45, in cooperation with spring 44, will further urge the fulcrum ring both outwardly and axially in firm contact with the flexible sealing flap 37 during periods of low temperature exposure so as to offset any retraction of the lip edge of the flap.

It will be understood that the fulcrum 43 in FIG. 3 and fulcrum 26 in FIGS. 1 and 2 constitute means for causing the flexible seal to move or flex outwardly when there is a contraction of the parts caused by a reduction in temperature. Also, it will be apparent that the compensating member 45 in FIG. 3 is a means for moving the fulcrum toward the flexible seal during a reduction in temperature, and further, that such a compensating ring or member could be similarly used adjacent the fulcrum 25 in the FIGS. 1 and 2 construction, if desired. Various other changes may be made in the construction and certain features may be employed without others without departing from the invention or sacrificing any of its advantages.

I claim:

1. A thermally responsive seal for a member which is adapted to have sealing engagement with the inner surface of a fluid conduit at the reduced temperatures encountered in handling cryogenic materials, comprising: flexible sealing means attached to said member and extending outwardly therefrom; a fulcrum operatively associated with said member and arranged adjacent and beneath said sealing means; and means for moving said fulcrum toward said flexible sealing means when there is a reduction in temperature.

2. A thermally responsive seal for a member having an annular groove in the edge thereof and adapted for use with cryogenic materials, comprising: flexible sealing means mounted in said groove and extending outwardly beyond the edge of said member; fulcrum means arranged adjacent to said sealing means; and means for moving said fulcrum toward said flexible sealing means when there is a predetermined reduction in temperature.

3. A thermally responsive seal for a member which is adapted to have sealing engagement with the inner surface of a conduit at the reduced temperatures encountered in handling cryogenic materials, comprising: flexible sealing means attached to said member and extending outwardly therefrom; fulcrum means arranged adjacent to said sealing means, said fulcrum means being composed of a material having a coefficient of expansion lower than those of said member and said conduit; and means for moving said fulcrum toward said flexible sealing means when there is a predetermined reduction in temperature.

4. A thermally responsive seal for a member which is adapted to have sealing engagement with the inner surface of a conduit at the reduced temperatures encountered in handling cryogenic materials, comprising: flexible sealing means attached to said member and extending outwardly therefrom; fulcrum means arranged adjacent to said sealing means, said fulcrum means being composed of a material having a coefficient of expansion lower than those of said member and said conduit; and means for moving said fulcrum toward said flexible sealing means when there is a predetermined reduction in temperature, said last-mentioned means being composed of a material having a coefficient of expansion lower than that of said fulcrum means.

5. Seal means for sealing the space between inner and outer members of substantially circular cross section, comprising: a flexible annular sealing element clamped along one edge portion to one of said members, the other edge portion of said element projecting into engagement with the adjacent surface of the other member and extending generally longitudinally thereof; and an annular fulcrum element supported by said one of said members and having contact with said sealing element along a line spaced a predetermined distance from the edge engaging said other member, said fulcrum element being formed from a material having a different coefficient of expansion than the member to which the sealing element is clamped whereby movement of such latter member in response to temperature change will cause a portion of said sealing element to swing about said fulcrum element to maintain firm engagement of said sealing element with said other member.

6. Seal means for sealing the space between inner and outer members of substantially circular cross section, comprising: a flexible annular sealing element clamped along one edge portion to one of said members, the other edge portion of said element projecting into engagement with the adjoining surface of the other element and extending generally longitudinally thereof; and an annular fulcrum element relatively movably supported by said one of said members and having contact with said sealing element along a line spaced a predetermined distance from the edge thereof engaging said other member, said fulcrum element being formed from a material having a different coefficient of expansion than the member to which the sealing element is clamped whereby movement of such latter member in response to temperature change will cause a portion of said sealing element to swing about said fulcrum element to maintain firm engagement of said sealing element with said other member.

7. Seal means for sealing the space between inner and outer members of substantially circular cross section, one of said members having an annular groove formed therein, comprising: a flexible annular sealing element clamped along one edge portion to said one member within said groove, the other edge portion of said element projecting into engagement with the adjoining surface of the other member and extending generally longitudinally thereof; and an annular fulcrum element movably supported in said groove and having contact with said sealing element along a line between the edge portion engaging the other member and the portion clamped to said one member, said fulcrum element being formed from a material having a different coefficient of expansion than the member to which the sealing element is clamped whereby movement of such latter member in response to temperature change will cause a portion of said sealing element to swing about said fulcrum element to maintain firm engagement of said sealing element with said other member.

8. Seal means for sealing the space between inner and outer members of substantially circular cross section, comprising: a flexible annular sealing element clamped along its inner edge portion to the inner member, the outer edge portion of said element projecting into engagement with the inner surface of the outer member and extending generally longitudinally thereof; and an annular fulcrum element supported by the inner member and having contact with said sealing element along a line spaced a predetermined distance from the periphery thereof, said fulcrum element being formed from a material having a lower coefficient of expansion than the inner member whereby contraction of the latter due to low temperature will cause the peripheral portion of the sealing element to swing outwardly to maintain firm engagement with the inner surface of the outer member.

References Cited in the file of this patent

UNITED STATES PATENTS

| | | |
|---|---|---|
| 1,914,741 | Gysling | June 20, 1933 |
| 2,253,904 | Haug | Aug. 26, 1941 |
| 2,586,927 | Fantz | Feb. 26, 1952 |
| 2,824,758 | Cattrell | Feb. 28, 1958 |
| 2,841,421 | Heere | July 1, 1958 |
| 2,976,066 | Antoniades | Mar. 21, 1961 |
| 3,056,615 | Breitenstein | Oct. 2, 1962 |